Patented Dec. 17, 1929

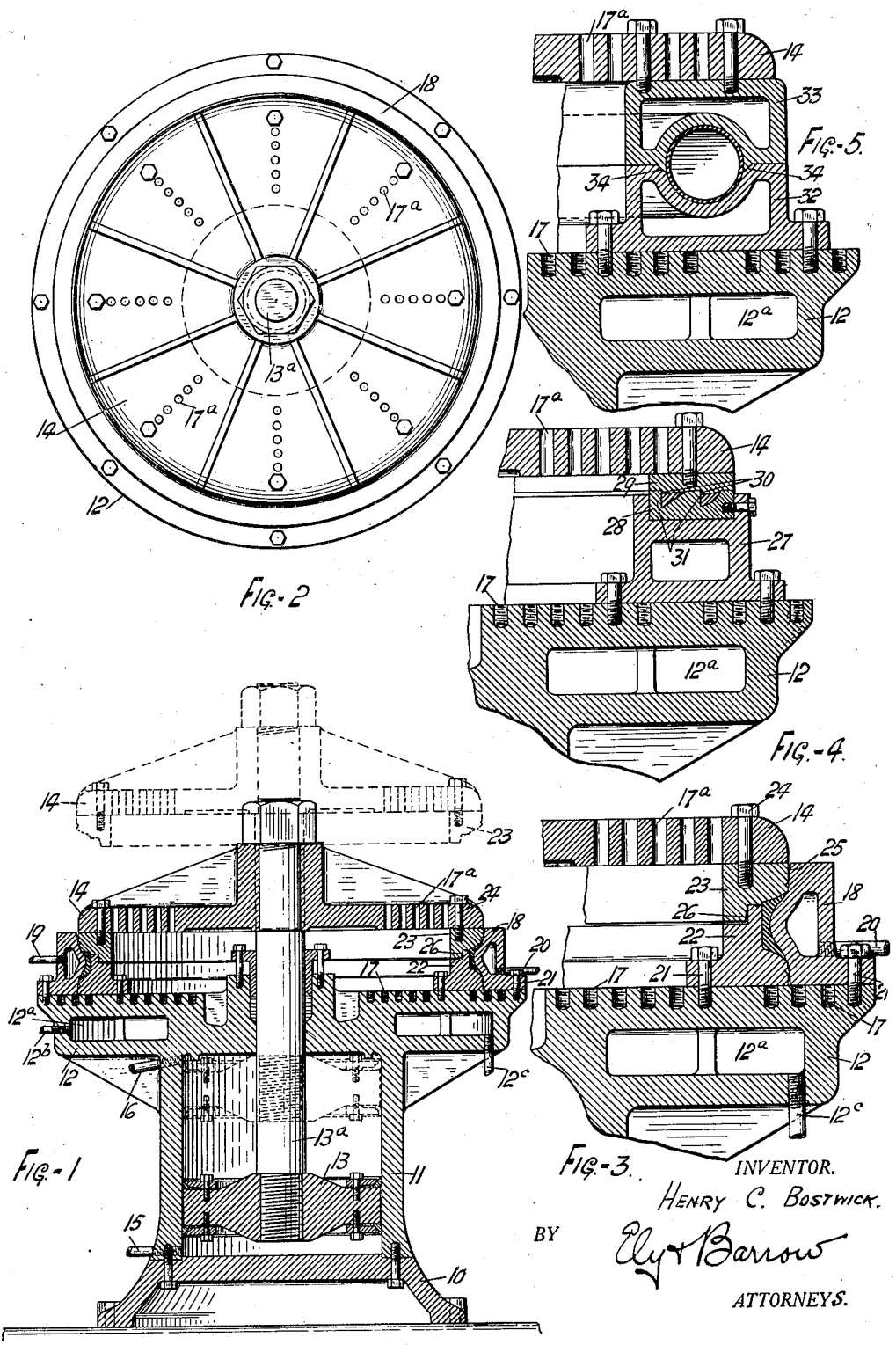

1,740,065

UNITED STATES PATENT OFFICE

HENRY C. BOSTWICK, OF KENMORE, OHIO, ASSIGNOR TO THE AKRON STANDARD MOLD COMPANY, OF AKRON, OHIO, A CORPORATION OF OHIO

VULCANIZER

Application filed December 29, 1926, Serial No. 157,714. Renewed April 27, 1929.

This invention relates to vulcanizers and particularly to vulcanizer presses for molding and curing various annular articles of rubber such as tire flaps, tire beads or inner tubes.

The general object of the invention is the provision of an improved press adapted for effective operation to mold any of the above or similar articles.

Particularly the invention is directed to presses for receiving two or three part molds for different articles of different sizes and pressing the mold parts together in proper registry during vulcanization.

The foregoing and other objects are attained by the construction illustrated in the accompanying drawings and described below. It is to be understood that the invention is not limited to the specific form thereof shown and described.

Of the accompanying drawings,

Figure 1 is a diametral section through a press embodying the invention having a three-part mold mounted thereon;

Figure 2 is a plan thereof;

Figure 3 is a detail radial section therethrough;

Figure 4 is a similar section therethrough with another form of mold secured therein; and Figure 5 is a similar view showing another form of mold.

Referring to the drawings, the numeral 10 designates a pedestal on which is mounted a hollow, cylindrical standard 11 providing a fluid pressure cylinder and formed with a circular platen 12 having an annular cavity $12^a$ therein for steam or other heating medium, a supply connection $12^b$ and a drain $12^c$ being provided for said cavity.

A piston 13 is arranged in cylinder 11 and is connected by a rod $13^a$ extending through platen 12 to a circular platen 14 adapted to be moved thereby toward and from platen 12. Fluid pressure connections 15 and 16 are arranged respectively on cylinder 11 above and below piston 13.

The platen 12 is formed with radial series of threaded apertures as indicated at 17, 17 and platen 14 is formed with corresponding radial series of non-threaded apertures $17^a$, whereby various two or more part molds of various sizes may be secured in the press as will be explained.

In Figures 1 and 2, a mold for rubber tire flaps is shown mounted in the press. This mold includes an outer annular member 18 having a cavity for steam or other heating medium therein to which are connected supply and drain pipes 19 and 20, said member being secured on the lower platen 12 by cap screws 21 extending through apertures in member into threaded apertures 17. There is also arranged on platen 12 an inner mold member 22 similarly secured thereto in mating relationship with the outer member. A second inner mold member 23 is secured on platen 14 by cap screws 24, 24 extending through apertures $17^a$ so as to be movable into mating relationship with the outer member 18 and other inner member 22. The members have tapered overlapping mating surfaces at 25 and 26 serving to guide them into proper registry with each other.

As shown in Figure 4, a bead molding device comprising a lower annular steam back 27 may be secured in the lower platen 12 and providing a channel on its upper surface into which a lower bead mold section 28 may be secured. The upper section 29 of the bead mold is secured on platen 14 and has projections 30, 30 thereon having tapered registering engagement with the mold cavities 31, 31 in mold section 28.

Figure 5 illustrates a tube mold mounted in the press including a section 32 secured on platen 12 and having a cavity for a heating medium therein and a similar section 33 secured on platen 14, the sections having mating tapered registering projections and recesses as indicated at 34, 34.

It will appear from the foregoing that a simple, inexpensive mold press has been provided capable of effective use with various types and sizes of molds, which latter are designed to be properly registered by the press. Modifications other than those illustrated and described may be resorted to without departing from the spirit thereof or the scope of the appended claims.

What is claimed is:

1. A vulcanizer press, including a fluid pressure cylinder comprising a support, a lower platen fixed on the cylinder and having radial series of threaded apertures therein, a piston in the cylinder, a piston rod extending through the platen and carrying an upper platen for cooperation with the lower platen, the upper platen having corresponding radial series of apertures therethrough, and mold members respectively on the upper and lower platens and having portions movable into overlapping relationship, the engaging surfaces of said portions being tapered to guide the mold members into registry.

2. A vulcanizer press, including a fluid pressure cylinder comprising a support, a lower platen fixed on the cylinder, a piston in the cylinder, a piston rod extending through the platen and carrying an upper platen for cooperation with the lower platen, and mold members respectively on the upper and lower platens and having portions movable into overlapping relationship, the engaging surfaces of said portions being tapered to guide the mold members into registry.

3. A vulcanizer press, including a fluid pressure cylinder comprising a support, a lower platen fixed on the cylinder and having radial series of threaded apertures therein, a piston in the cylinder, a piston rod extending through the platen and carrying an upper platen for cooperation with the lower platen, the upper platen having corresponding radial series of apertures therethrough, and mold members respectively on the upper and lower platen.

HENRY C. BOSTWICK.